United States Patent [19]
Velles

[11] Patent Number: 6,065,616
[45] Date of Patent: May 23, 2000

[54] MULTIPLE PORTFOLIO HANGING FILE

[76] Inventor: Speros Velles, 9 Hilltop Dr., Franklin, Conn. 06254

[21] Appl. No.: 09/303,990

[22] Filed: May 3, 1999

Related U.S. Application Data

[60] Provisional application No. 60/084,115, May 4, 1998.

[51] Int. Cl.[7] .................................................. A47F 5/00
[52] U.S. Cl. .............................. 211/55; 206/425; 190/900
[58] Field of Search .................................. 211/55, 10, 2; 190/108, 900; 294/141, 142; 224/275, 277; 206/425; 229/69

[56] References Cited

U.S. PATENT DOCUMENTS

| | | |
|---|---|---|
| 668,727 | 2/1901 | Chapman . |
| 2,779,371 | 1/1957 | Klehv . |
| 3,023,907 | 3/1962 | Ross .......................................... 211/55 |
| 4,444,314 | 4/1984 | Jacobsson ............................... 206/425 |
| 4,871,066 | 10/1989 | La Wall .................................. 206/425 |
| 5,226,576 | 7/1993 | Ellsworth ........................... 224/275 X |
| 5,390,801 | 2/1995 | Hausen ..................................... 211/55 |
| 5,477,967 | 12/1995 | Voorhees et al. ........................ 211/55 |

*Primary Examiner*—Robert W. Gibson, Jr.
*Attorney, Agent, or Firm*—John M. Brandt

[57] ABSTRACT

Two or more portfolios are slideably attached in face to face relationship to provide in one mode of use a brief case and in a second mode of use a hanging file. In the brief case form, the portfolios are at the same level, the bottom of each being substantially in alignment with the other which is accomplished by for example the use of handles, one on each of the two outer portfolios. In the hanging file form, the portfolios are at different levels, which is accomplished by securing one of the portfolios from a selected point, such as the back seat of a car.

7 Claims, 4 Drawing Sheets

MULTIPLE PORTFOLIO HANGING FILE

CROSS REFERENCE TO RELATED APPLICATIONS

This application is a formal application based on a disclosure submitted as a provisional application entitled Multiple Portfolio Hanging File, Ser. No. 60/084,115, filed May 4, 1998 by the same inventor.

BACKGROUND OF THE INVENTION

1. Field of the Invention

The invention relates to multiple portfolio cases and more particularly relates to a combination of two or more portfolios which may be transported together or hung as joined but spatially separated units.

2. Description of the Prior Art

Business or professional people such as salesmen, field engineers, or others who have occasion to travel to sites away from an office are in need of cases to transport brochures, documents, plans and other such papers necessary to their work. A variety of cases with multiple pockets are available for such purpose and include attache cases, brief cases, larger salesmen's cases and the like.

The present invention departs from the standard configuration of joined multiple portfolios in the forms mentioned above to provide a unit of multiple portfolios which may be carried in face to face relationship but are also free to mutually slide in a vertical direction when hung. In the carrying mode, the two or more portfolios mutually slide upward such that when carried by, for example, attached handles, they function as a brief case with the portfolios presenting the same profile. In the hanging mode the two or more portfolios mutually slide downward or away from each other such that one portfolio is positioned above the other.

The inventor knows of no prior art disclosing the concept or detailed structure of this combination.

SUMMARY OF THE INVENTION

The invention may be summarized as a multiple combination of two or more portfolios in which the portfolios are separate and distinct and are slideably attached or mounted to each other in face to face relationship. The attachment means is such that the portfolios are free to move vertically with respect to each other, the receiving or open edge for papers, documents, maps, etc. of each being considered as horizontal. Thus when each of the outer portfolios is supported by, for example, a handle, the portfolios form a briefcase like unit when carried, but when only one of the outer units is supported by for example, a strap or one of the handles, the other portfolio or portfolios slide downward to form a hanging unit.

The invention is particularly appropriate for use in an automobile where the back of the front seat provides an ideal hanging location. The invention may thus be carried into an office or meeting in a compact brief case mode wherein desired printed material may be taken out or added to the unit and then hung within an automobile for easy access during sales calls or other field activities.

The construction, features, and function of the invention will become more clear from the drawings and description of the preferred embodiment which follows.

DESCRIPTION OF THE PREFERRED EMBODIMENT

Figure 1:
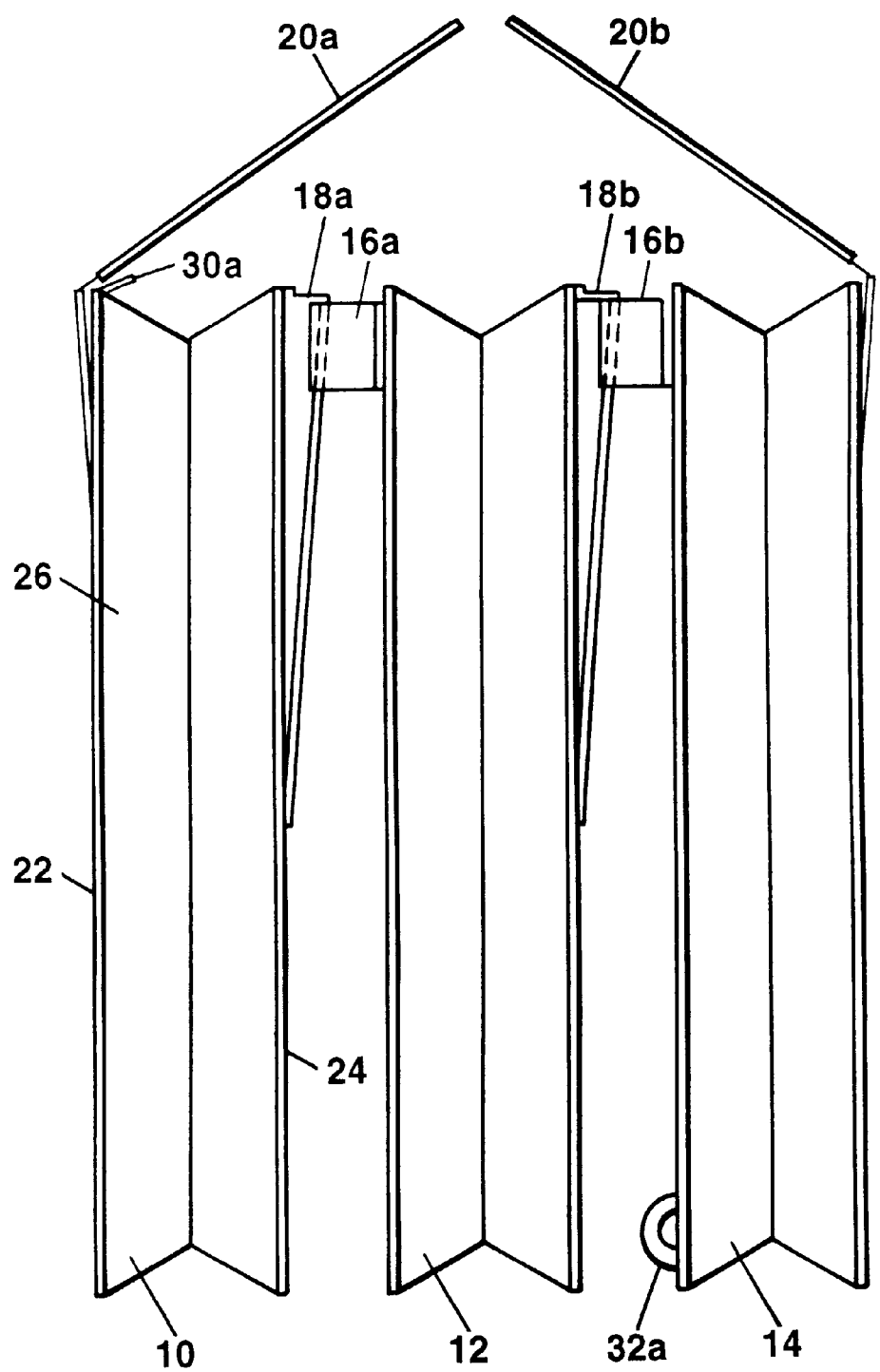
FIG. 1 is a side view of the preferred embodiment of the invention in a first aligned position.

FIG. 1 illustrates a side view of the preferred embodiment of the invention in which three portfolios 10, 12, and 14 are slideably attached by for example horizontal strap 16a and 16b communicating with vertical straps 18a and 18b. Outside portfolios 10 and 14 are fitted with retractable-extendible handles 20a and 20b which when gripped together will cause portfolios 10, 12, and 14 to align to form a brief case style file.

Each basic portfolio is open at the top and comprised of a front 22, back 24, two creased side pieces 26, and a bottom 28 all preferably constructed of a flexible material such as leather. They are all essentially identical although if desired they may separately be fitted with smaller internal pockets for organizational convenience.

Figure 2:
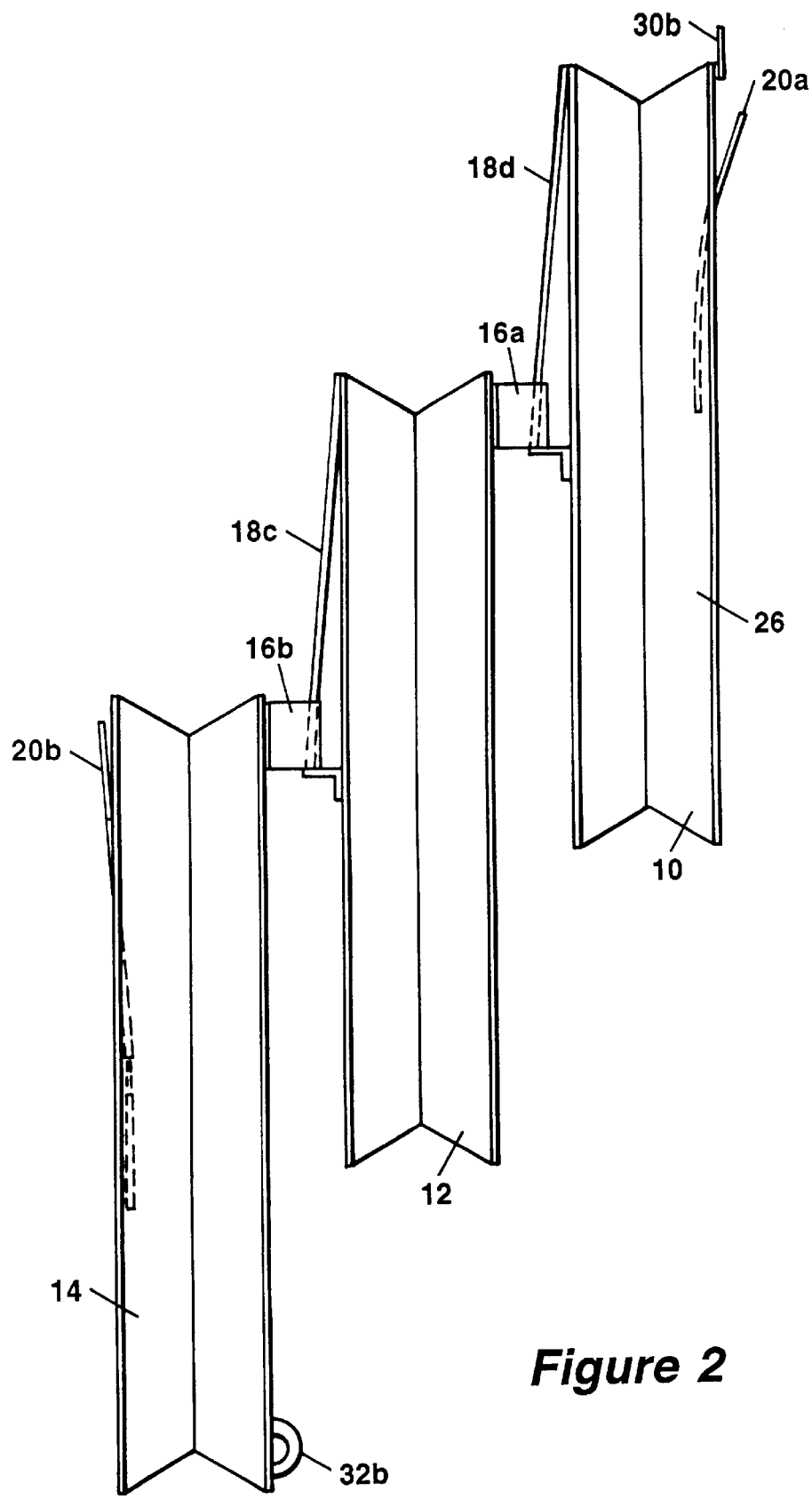
FIG. 2 is an opposite side view of the preferred embodiment of the invention in a second extended position.

FIG. 2 shows the preferred embodiment from the opposite side in a hanging position with handles 20a and 20b retracted. Vertical straps 18c and 18d connecting with horizontal straps 16a and 16b provide hanging support for the units along with straps 18a and 18b on the opposite side. As will be shown loops 30a and 30b and 32a and 32b provide means for hanging and securing the unit in a desired location.

Figure 3:
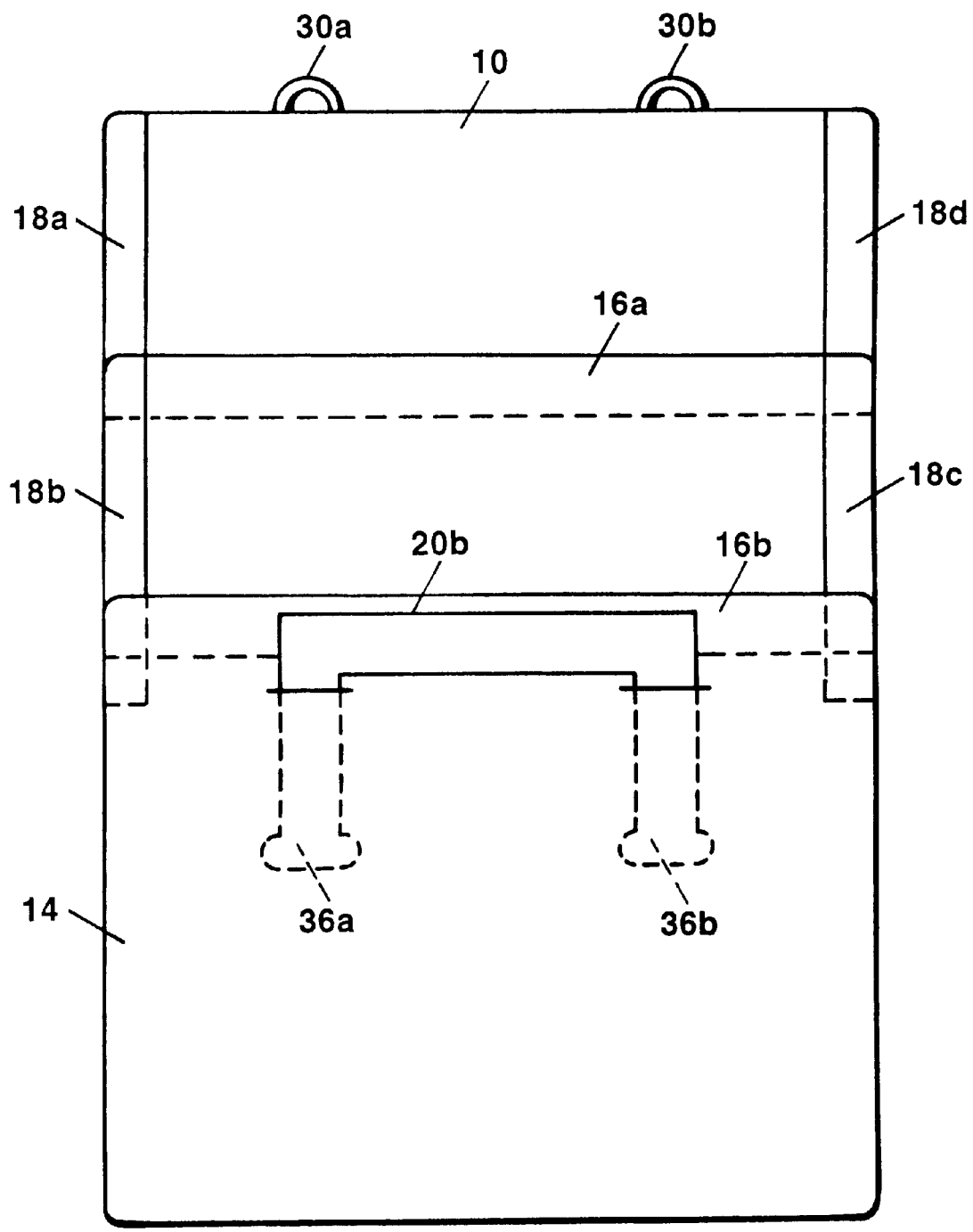
FIG. 3 is a front view of the position of FIG. 2.

Referring next to FIG. 3, there is illustrated a front view of the preferred embodiment in the position of FIG. 2. Handle 20b passes through slits 34a and 34b and is shown retracted. A variety of conventional design approaches may be used to secure the handle in the extended position, for example stops 36a and 36b.

Figure 4:
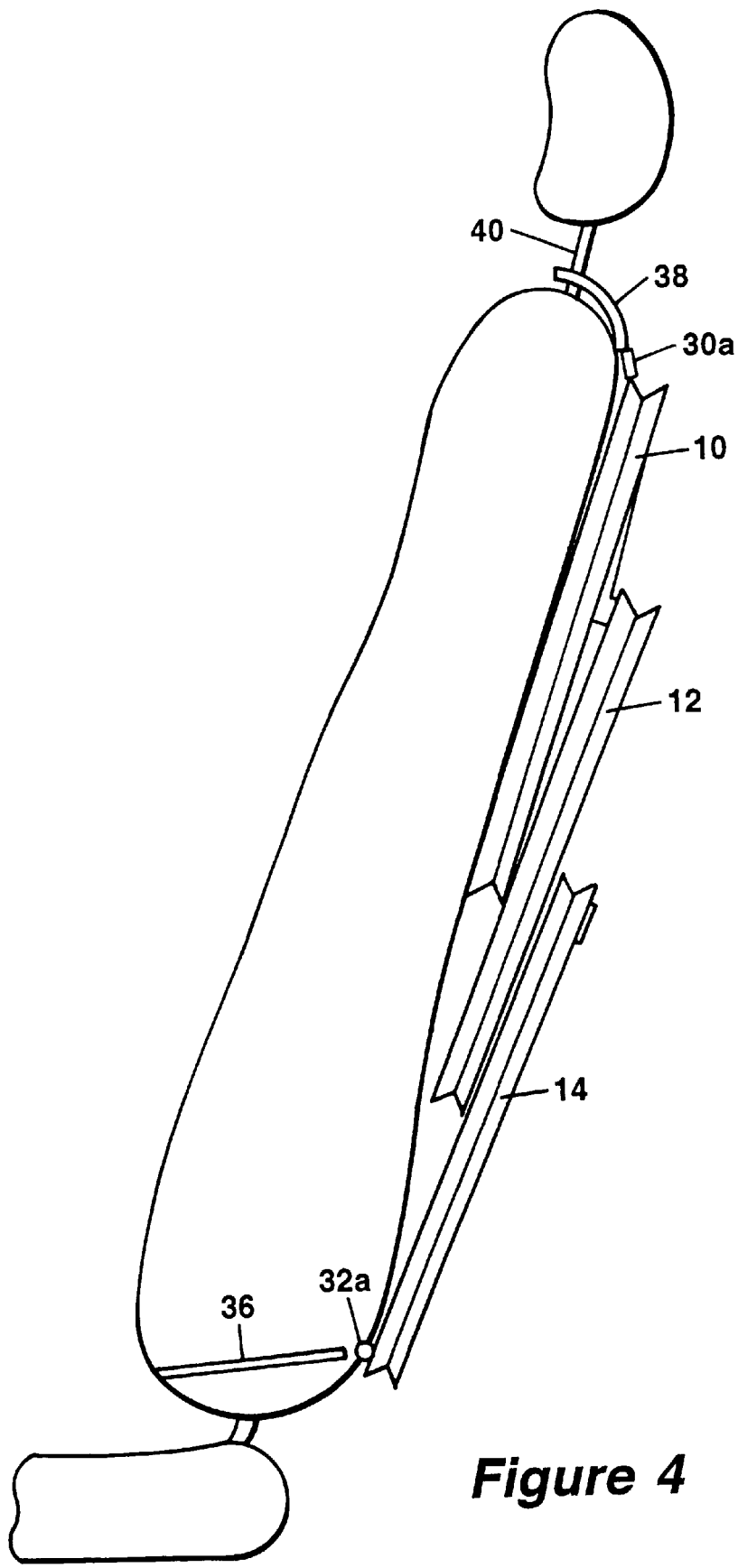
FIG. 4 is a side view of the preferred embodiment in an extended position as hung on an automobile seat.

FIG. 4 illustrates the invention in the hanging position attached to an automobile seat 34. Strap 36 fastened to loop 32a passes around the bottom of the seat and attaches at the other side to loop 32b not shown. Similarly strap 38 attached to loop 30a passes over headrest support 40 and attaches at the other side to loop 30b not shown. In this manner the unit is securely fastened allowing each of the portfolios 10, 12, and 14 to be easily accessed.

Other embodiments of the invention will now be obvious to those skilled in the art. Particularly other means of slideably attaching the separate portfolios such as rings and slides instead of horizontal and vertical straps may be used. Accordingly, the invention is hereby defined by the following claims.

What is claimed is:

1. A multiple portfolio hanging file comprising in combination:

a. a first portfolio having an open top adapted to receive items of printed matter;

b. a second portfolio having an open top also adapted to receive items of printed matter;

c. attaching means for slideably attaching said first and second portfolios in face to face relationship whereby upon supporting one of said portfolios, the other will hang below to provide at least two vertically spaced apart file receptacles; and d. a carrying handle attached to each of said portfolios whereby when each of said handles are held, the portfolios are aligned to form a brief case.

2. The apparatus of claim 1 wherein said handles are retractable.

3. The apparatus of claim 1 further including hanging means attached to one of said portfolios.

4. The apparatus of claim 3 wherein said hanging means comprises a loop suitable for receiving a strap.

5. The apparatus of claim 1 further including securing means attached to one of said portfolios.

6. The apparatus of claim 5 wherein said securing means comprises a loop suitable for receiving a strap.

7. A multiple portfolio hanging file comprising in combination:

a. a first portfolio having an open top adapted to receive items of printed matter;

b. a second portfolio having an open top also adapted to receive items of printed matter; and c. attaching means for slideably attaching said first and second portfolios in face to face relationship whereby upon supporting one of said portfolios, the other will hang below to provide at least two vertically spaced apart file receptacles; said attaching means comprising a horizontal strap positioned at the top of said first portfolio and a pair of vertical straps positioned at the sides of said second portfolio each communicating with said horizontal strap.

* * * * *